United States Patent [19]

Hines et al.

[11] Patent Number: 4,571,807

[45] Date of Patent: Feb. 25, 1986

[54] DRIVESHAFT REBUILDING MACHINE

[75] Inventors: Gordon E. Hines; Arthur W. Henke; Vernon J. Burzan, all of Ann Arbor, Mich.

[73] Assignee: Hines Industries, Inc., Ann Arbor, Mich.

[21] Appl. No.: 599,510

[22] Filed: Apr. 12, 1984

[51] Int. Cl.⁴ .............................................. B23P 19/04
[52] U.S. Cl. ..................................................... 29/252
[58] Field of Search ................ 29/237, 238, 251, 252, 29/281 A; 269/25, 37, 43, 55, 296; 228/49 R, 49 B, 44.1, 44.5

[56] References Cited

U.S. PATENT DOCUMENTS

| 2,807,080 | 9/1957 | Mathews | 29/251 |
| 2,948,057 | 8/1960 | Dagenais | 29/251 |
| 4,459,727 | 7/1984 | Burton et al. | 269/43 |

*Primary Examiner*—Robert C. Watson
*Attorney, Agent, or Firm*—Emch, Schaffer, Schaub, & Porcello Co.

[57] ABSTRACT

A driveshaft rebuilding machine for installing an end piece on a driveshaft tube is disclosed. Self-centering clamps engage and center the tube and maintain radial positioning of the tube. A fixture mounts an end piece in precise alignment with the tube. A cylinder ram extends to press-fit the end piece on the tube. During pressing, the clamps and tube are free to move longitudinally as a unit until reaching a stop position but are prevented from moving radially.

16 Claims, 16 Drawing Figures

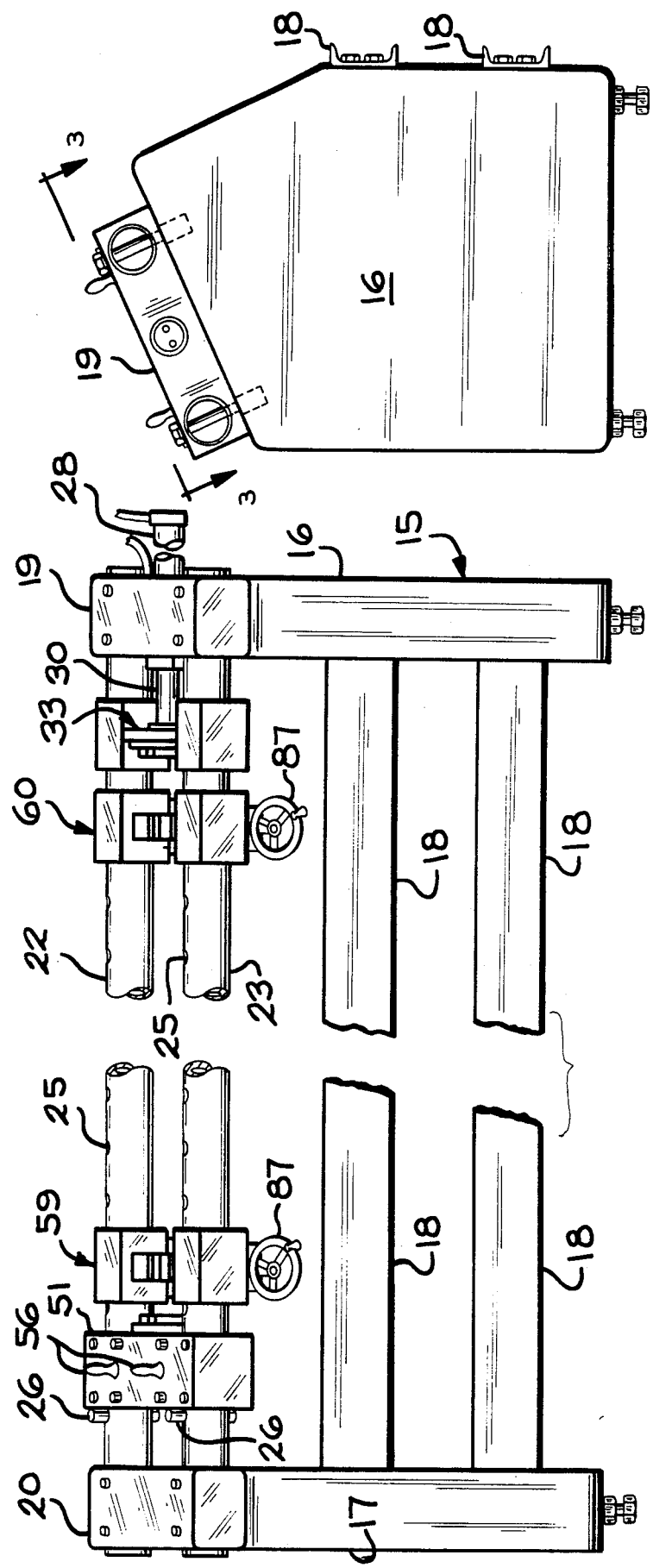

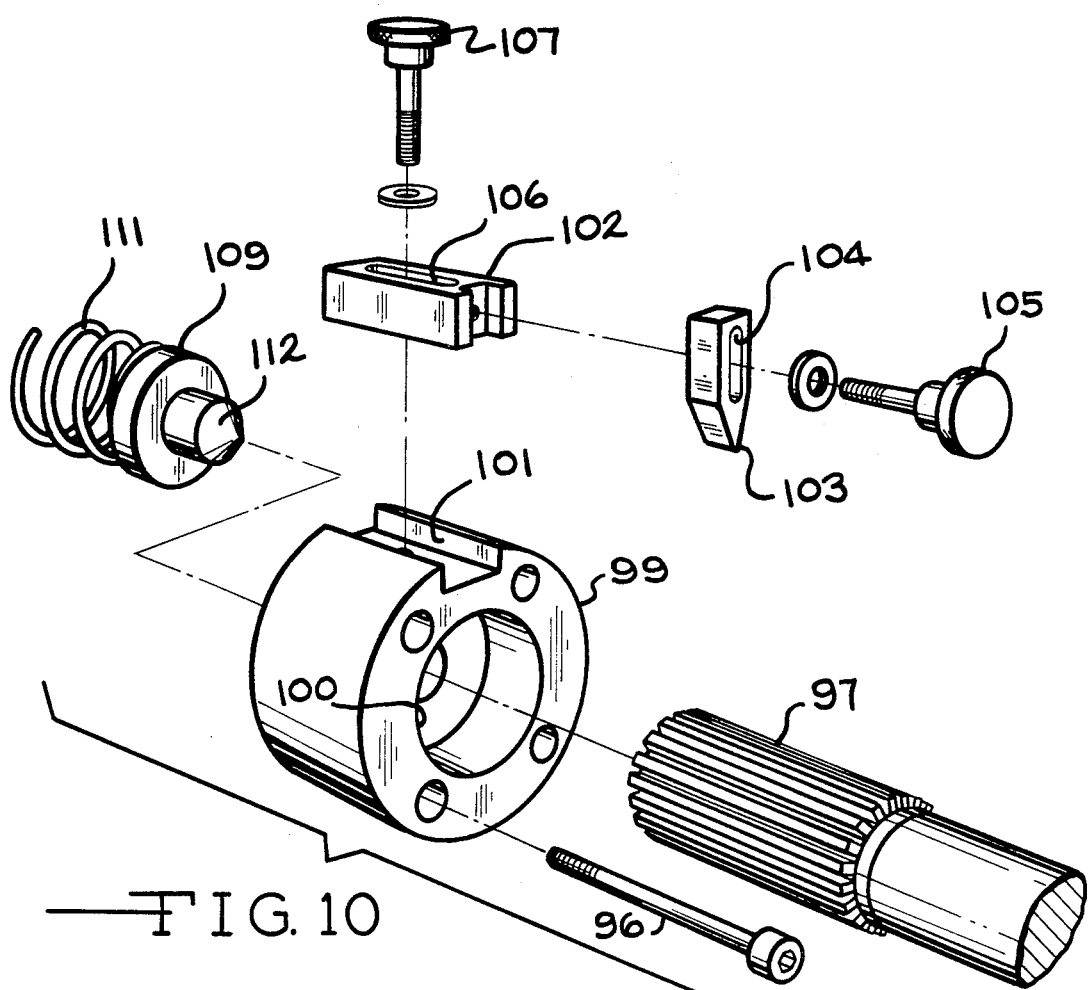
FIG. 10
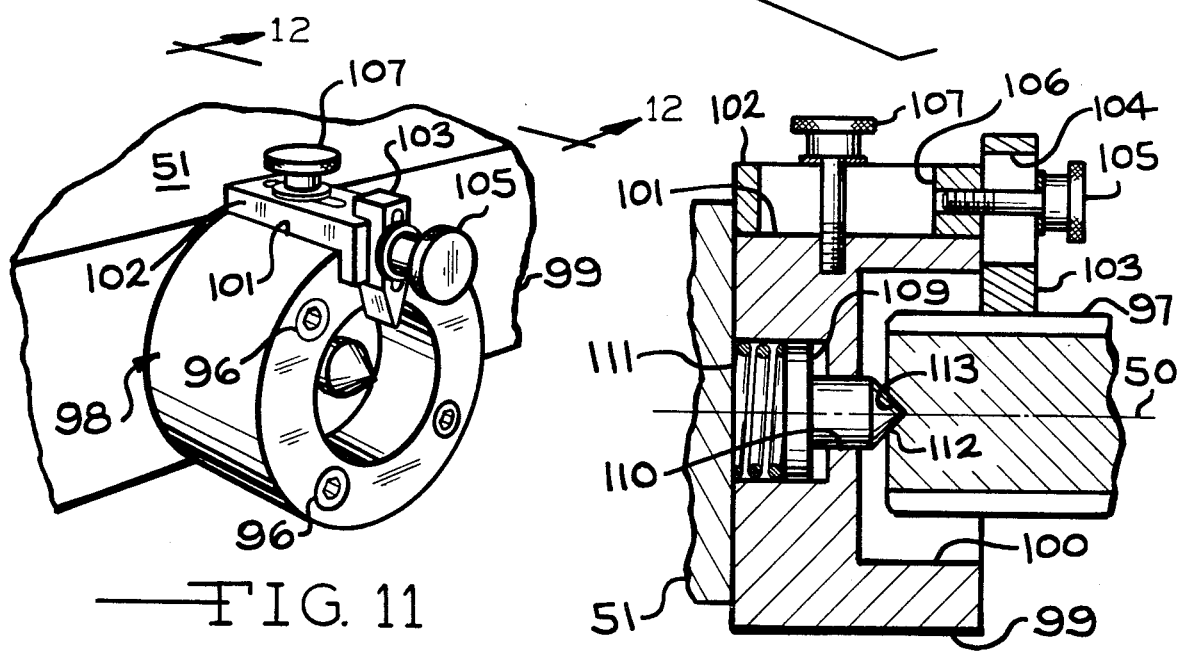
FIG. 11
FIG. 12

DRIVESHAFT REBUILDING MACHINE

BACKGROUND OF THE INVENTION

Driveshaft rebuilding machines are known in the art and are sometimes called push-up machines. These machines essentially attach driveshaft end pieces to driveshaft tubes by press-fitting the end pieces to the tubes. One prior art configuration is essentially a horizontal arbor press which has been elongated to accept driveshafts up to 8 feet in length. This machine press-fits end pieces such as tube splines or yokes to the driveshaft tube prior to welding of such end pieces to the tube.

Prior art driveshaft rebuilding machines often were unable to maintain an accurate common centerline between the end pieces and the tube throughout the pressing operation. During the pressing operation on some prior art machines, the components moved relative to one another. While the end pieces were restrained radially by friction, the tube was free to float radially as well as longitudinally. This undesirable radial motion often resulted in a radial misalignment which is commonly termed "run out". If the radial misalignment was extreme, splitting of the tube sometimes resulted.

When using such a prior art push-up machine, removing excessive run out before the welding operation required extensive straightening, which, of course, added to the overall time and cost of rebuilding a driveshaft.

The end pieces are held in tooling or fixtures. Because a rebuilding operation deals with many difference sizes of driveshafts and end pieces and also with difference styles of end pieces, many prior art machines did not include fixtures which placed the end pieces on a common centerline relative to the tube, thus resulting in run out as mentioned above. In some prior art machines, all U-joint end pieces were required to be disassembled prior to installing such end pieces to the driveshaft tube. In these operations the tube yoke only was installed. The spline yoke or flange yoke and the journal cross were removed. Because of this fact and because the machine operator did not have any mechanism for establishing a common center between the tube and the end pieces run out often occurred.

Under actual vehicle operating conditions, driveshafts normally run with a U-joint at each end. The standard U-joint consists of two opposing yokes mutually joined by a journal cross. When the driver yoke rotates at a constant speed, the adjoining driven yoke undergoes a final sinusoidal speed variation proportionate to the degree of joint flex. These fluxuations may be minimized by orientating the driver yoke at one end relative to the driver yoke at the other end of the tube. This technique is well-known and is called phasing.

Many prior art push-up machines depended upon operator judgement in setting up the phase of end pieces such as opposed "U-joints". The U-joint at one end is usually mounted on a spline shaft, while the other U-joint is mounted directly to the shaft tube. The push-up machine pressing operation normally involves installing a tube spline at one end and a U-joint at the other end. To obtain proper phasing, the U-joint at one end must be coordinated and aligned with one of the spline teeth at the other end. Often, tube blanks and small spline diameters also combine to make manual phase alignment, done by individual operators, relatively inaccurate.

SUMMARY OF THE INVENTION

The present invention is directed to an improved driveshaft rebuilding machine or push-up machine. The present driveshaft rebuilding machine clamps the driveshaft tube in a defined relationship with the end piece fixtures such that accurate phasing is obtained together with minimum run out. The present driveshaft rebuilding machine includes novel clamping assemblies having jaws which grip the driveshaft tube near the tube ends. The two spaced clamping assemblies are slideable along the longitudinal machine axis. This allows tubes of varying length to be gripped. Upon securing a driveshaft tube, both clamp assemblies become mutually connected through the intermediate tube to form a rigid unit. This unit is free to move longitudinally relative to the machine while being restrained from transverse or radial movement.

During the pressing operation, the end pieces are displaced toward one another by a ram. The tube-clamp unit is free to move longitudinally without axial stress. Any tensile or compression forces are born by the machine bed or machine support and the driveshaft tube, respectively. As noted, any relative movement between the driveshaft tube and the driveshaft end pieces is constrained to the longitudinal direction of the machine while at the same time maintaining constant radial positioning. The individual clamping assemblies include opposing jaws which move together in a precise equal magnitude and in opposite directions. In this manner, the geometric center between the two opposing jaws is always preserved in a stationary location regardless of jaw spacing. Driveshaft tubes of various diameters are thereby secured on a constant centerline, which is also the constant centerline of the end piece fixtures or tools.

In a preferred embodiment a threaded shaft is mounted in threaded pins whose rotational axis is perpendicular to the shaft axis. Movement of the pins opens and closes the jaw. Any jaw motion that would otherwise tend to bind the shaft appears as rotation between the pins and the jaws.

In the preferred embodiment, the jaw pin acts in conjunction with a second vertically spaced pin and slide surface to constitute a self-locking system. Clamping pressure applies a torque to the jaws trying to rotate the jaws. The spaced pins are so orientated as to utilize this torque advantageously and create a force normal to the slide surface. This deliberate "binding" of the jaw to the slide surfaces when clamped gives the clamp the self-locking characteristic. Preferably, the binding forces that lock the jaws are always proportional to the clamping forces attempting to unlock the jaws.

In a preferred embodiment of the invention, the jaws are initially centered during machine manufacture. The lead shaft is fixed at one end to a brace member via thrust-bearings to prevent undesired movement of the screw. Interposed between the shaft and such thrust-bearings is a shaft collar through which the shaft passes. The collar faces bear upon the thrust-bearings. During the machine fabrication the jaws are clamped on a master tube, the axis of which is coincident with end piece fixture axis. In this position, the shaft and collar are drilled and pinned together. This permanently fixes the lead shaft to the brace member via the thrust-bearings.

Still another feature of the present push-up machine are the fixture means or tools for centering and phasing of the end pieces.

The driveshaft tube is generally fitted with a tube spline at one end and a U-joint at the other end. Often, the tube spline has a machine-center in the form of a conical depression which is a consequence of its manufacture. This center represents the true geometric center of the spline. In the preferred embodiment, a fixture or tool of the present machine enables accurate centering of the spline end piece relative to the centerline of the tube by employing a spring-loaded and axially moveable center having a conical centering point which engages the spline center. The centering point moves along a longitudinal axis coincident with the tube axis. Spring-loading the point provides initial centering until the spline strikes an anvil member, at which time friction takes over in maintaining the spline in correct center position during the remaining machine pressing operation.

In one embodiment, one tool includes an adjustable pointer which provides proper angular orientation of the spline during pressing. The pointer is prealigned with index pins on the U-joint fixture at the other end of the machine to assure accurate mechanical phasing, as discussed above.

Still another improvement in the present machine ensues from performing the push-up operation with partially or completely assembled U-joints. Dimensional tolerances between joint components are therefore intrinsically compensated for by aligning the tube centerline with the true reference center found in the assembled end piece. The present machine includes tooling fixtures for centering, for example the journal-cross, when a complete joint assembly is not feasible. Several basic tooling fixture units using a variety of spacer inserts enable the present push-up machine to accomodate an entire range of journal-crosses which are typically encountered. Normally, the tooling fixtures are designed such that the end pieces are contacted by an indexing pin mounted in or on the ram. The indexing pin, acting in cooperation with the previously mention spline pointer, obviates operator error and correctly phases the driveshaft workpieces.

DESCRIPTION OF THE DRAWINGS

FIG. 1 is an elevational view, with parts broken away, of a driveshaft rebuilding machine or push-up machine, according to the present invention;

FIG. 2 is a side elevational view of the machine shown in FIG. 1;

FIG. 10 is an exploded view of a spline end tooling fixture;

FIG. 11 is a perspective view of the spline end tooling fixture in its assembled relationship;

FIG. 12 is a cross-sectional view taken along the line 12—12 of FIG. 11 and shown on an enlarged scale;

DETAILED DESCRIPTION OF THE PREFERRED EMBODIMENT

Figure 6:
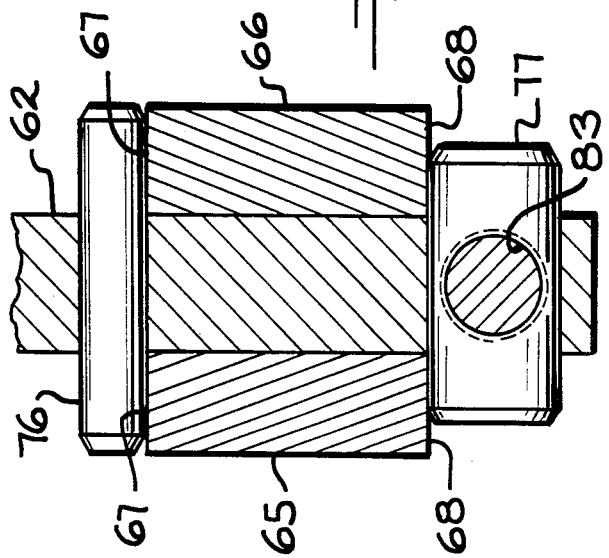
FIG. 6 is a fragmentary, cross-sectional view taken along the line 6—6 of FIG. 4 and shown on an enlarged scale.

A driveshaft rebuilding machine, according to the present invention, is generally indicated in the drawings by the reference number 15. The machine 15 includes opposed machine ends 16 and 17 which are interconnected by machine support members 18. In the present embodiment, the machine ends 16 and 17 are constructed of concrete and the support members 18 comprise metal channels.

Figure 3:
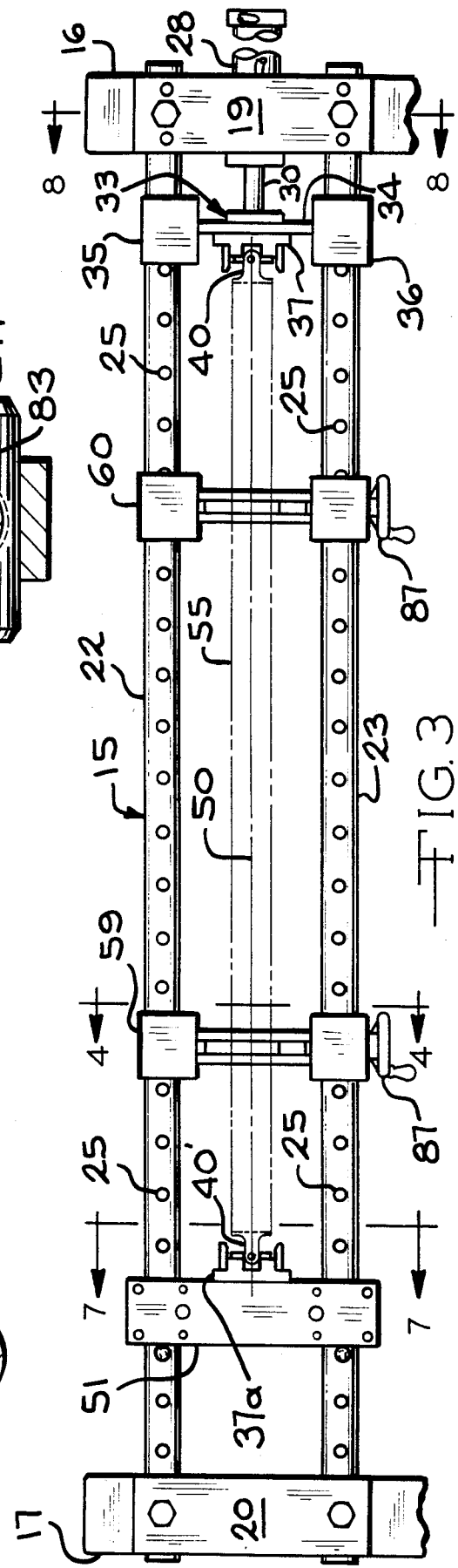
FIG. 3 is a plan view of the machine shown in FIG. 1.
Figure 8:
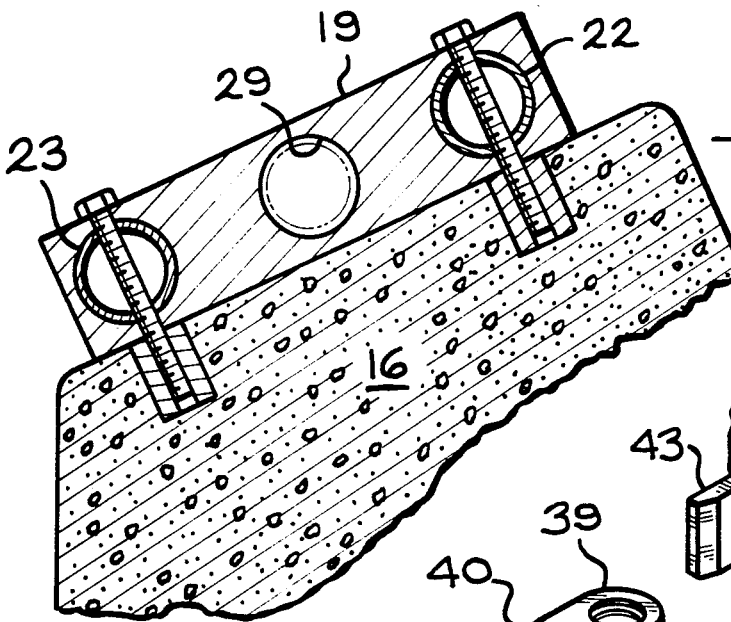
FIG. 8 is a fragmentary, cross-sectional view taken along the line 8—8 of FIG. 3 and shown on an enlarged scale.

Referring to FIGS. 2, 3 and 8, an end block 19 is bolted to the upper surface of the machine end 16 and an end block 20 is bolted to the upper surface of the machine end 17. A pair of parallel guide ways or guide rods 22 and 23 extend through and are connected at their ends to the end blocks 19 and 20. Each of the rods 22 and 23 include a plurality of aligned and spaced holes 25 which receive stop pins 26, as shown in FIG. 1. A hydraulic cylinder 28 is mounted in an opening 29 defined by the end block 19. The cylinder 28 includes a ram 30 which mounts an end piece fixture assembly or tool 33.

Referring to FIGS. 1 and 3; the fixture 33 includes a cross member 34 having guide blocks 35 and 36 at its outer ends. The guide blocks 35 and 36 include openings which are machined to the outer diameters of the guide rods 22 and 23. The end piece fixture 33 moves longitudinally along the guide rods 22 and 23 in response to movement of the ram 30 of the double acting hydraulic cylinder 28.

Figure 9:
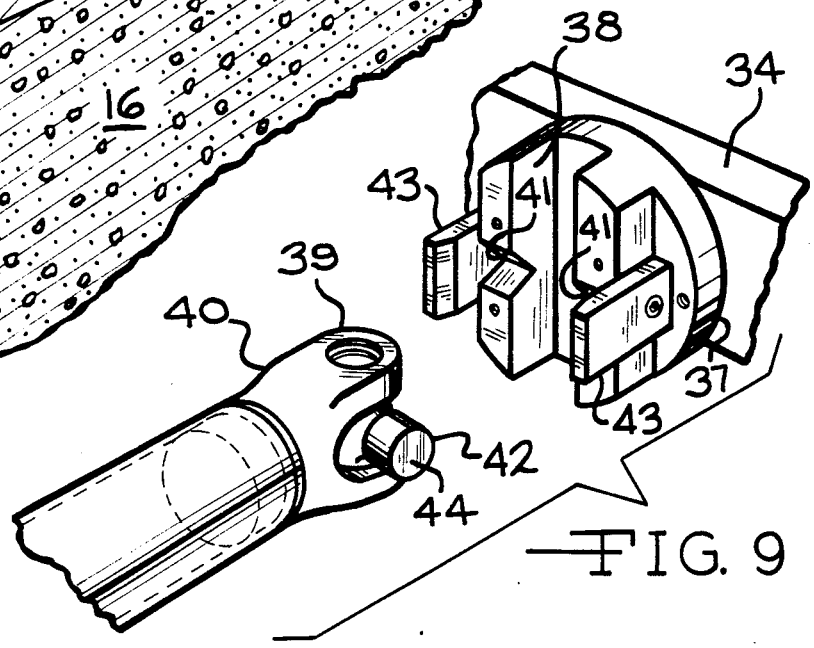
FIG. 9 is a fragmentary, exploded view showing a driveshaft end piece and a driveshaft tube as the press-fit assembly is being removed from the tooling fixture.

Referring to FIG. 9, the end piece fixture 33 also includes a tool 37 which is removeably bolted to the cross member 34. The tool 37 is representative of tools which are used in the end piece fixture assembly 33, however, it is understood that various tools may be utilized depending upon the characteristics of the end piece.

The tool 37 defines a vertical slot 38 for closely receiving a yoke 39 of a U-joint 40. The tool 37 includes V-grooves 41 for receiving a journal cross 42 of the U-joint 40. The tool 37 also includes opposed sideplates 43 which guide the journal cross 42 into the V-grooves 41 with the outer ends 44 of the journal cross 42 being closely engaged and centered by the sideplates 43.

Figure 7:
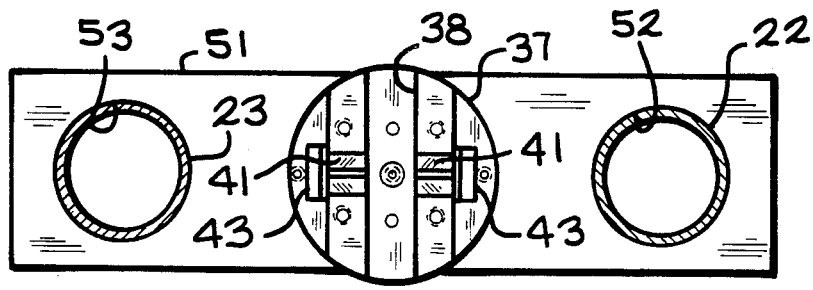
FIG. 7 is a cross-sectional view taken along the line 7—7 of FIG. 3 and shown on an enlarged scale.

As shown in FIG. 3, the machine 15 defines a longitudinal centerline 50. The tool 37 at one end of the machine 15 and a corresponding tool 37A located at the other end of the machine ensures that the driveshaft end pieces, in this case U-joints 40 and 40', will be exactly centered on the centerline 50 prior to the pressing step. The tool 37' located at the other end of the machine is mounted on a moveable anvil member 51. Referring to FIG. 7, the anvil member 51 defines openings 52 and 53 which receive the machine guide rods 22 and 23. The anvil member 51 may be moved longitudinally along the centerline 50 of the machine 15 to adjust for varying lengths of driveshaft tubes 55. Referring to FIG. 1, handles 56 extend vertically upwardly from the anvil member 51 for ease in sliding the anvil member 51 along the guide rods 22 and 23. Upon correct positioning, as best shown in FIG. 1, the stop pins 26 are inserted. Upon extension of the cylinder ram 30, the anvil member 51 provides the counter force for press-fitting the driveshaft end pieces, for example the U-joints 40 and 40' to the driveshaft tube 55.

Figure 5:
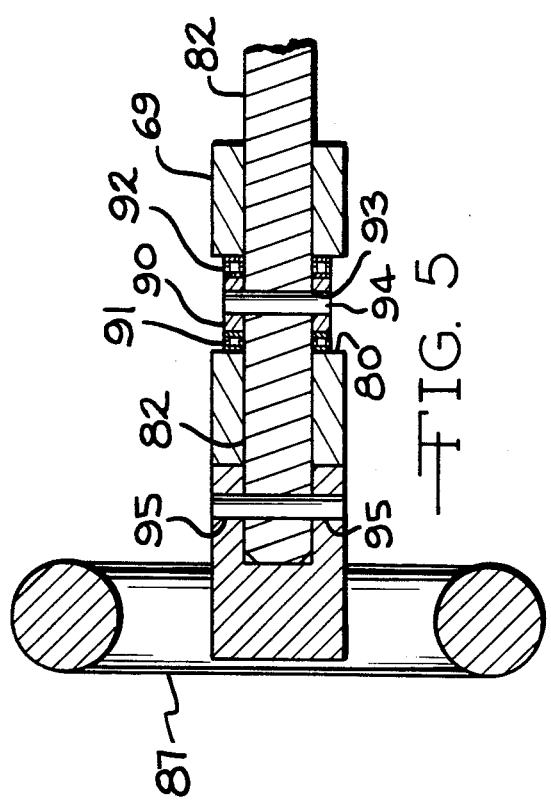
FIG. 5 is a fragmentary, cross-sectional view taken along the line 5—5 of FIG. 4 and shown on an enlarged scale.
Figure 4:
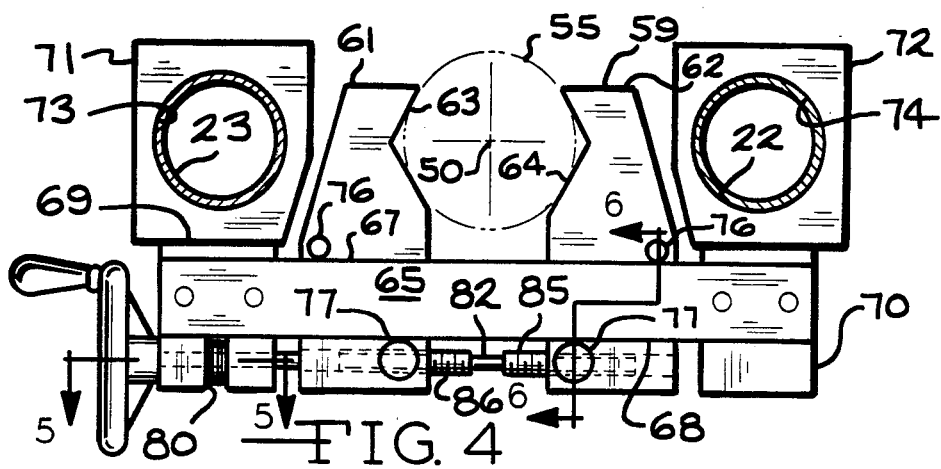
FIG. 4 is a cross-sectional view taken along line 4—4 of FIG. 3 and shown on an enlarged scale.

The driveshaft rebuilding machine 15 includes a pair of clamp assemblies 59 and 60 which are spaced from one another and mounted for movement on the parallel guide rods 22 and 23. Referring to FIGS. 4, 5 and 6, the clamping assembly 59 includes a pair of opposed clamp jaws 61 and 62 which define V-grooves 63 and 64. As shown in FIG. 4, the driveshaft tube 55 is positioned in the grooves 63, 64 and the jaws 61, 62 maintain the centerline of the driveshaft tube 55 on the precise centerline 50 of the machine 15. The clamping assembly 59 includes spaced cross bars 65 and 66 which define upper slide surfaces 67 and lower slide surfaces 68. (See FIG. 6). The spaced cross bars 65 and 66 are attached at their outer ends to spaced brace members 69 and 70. In turn, the brace member 69 mounts a slide block 71 while the brace member 70 mounts a slide block 72. The slide block 71 defines an opening 73 which receives the guide rod 23 while the slide block 72 defines an opening 74 which receives the guide rod 22. During the pressing operation, the slide blocks 71 and 72 move along the guide rods 22 and 23 in a direction longitudinal of the machine 15 while the clamp assemblies 59, 60 prevent transverse and radial movement of the driveshaft tube 55. In this manner, the centerline of the driveshaft tube is maintained coincidental with the centerline 50 of the machine 15.

Referring to FIG. 6, bearing pins 76 extend through the clamp jaws 61 and 62 and bear on the upper slide surfaces of 67 the cross bars 65 and 66. Similarly, lower bearing pins 77 extend through the jaws 61 and 62 and slide on the lower slide surfaces 68 of the cross bars 65 and 66.

The brace member 69 defines a slot 80 (see FIGS. 4 and 5). The lower end of the brace member 69 and lower end of the clamp jaws 61 and 62 define a bore 81 which receives a threaded lead screw shaft 82. The lower bearing pins 77 which are carried by the clamp jaws 61 and 62 also define threaded openings 83 which are in alignment with the bore 81 and which also receive the shaft 82. Referring to FIG. 4, the right hand side of the shaft 82 has a right hand threaded portion 85 which is engaged with the threaded opening 83 in the clamp jaw 62. The shaft 82 includes a left hand threaded portion 86 which is threadably engaged with the opening 83 defined by the lower bearing pin 77 of the clamp jaw 61. A hand wheel assembly 87 is pinned to the outer end of the shaft 83. As the shaft 83 is rotated clockwise by operation of the hand wheel 87 the clamp jaws 61 and 62 move toward the driveshaft tube 55. Similarly, upon counterclockwise rotation of the hand wheel 87 the clamp jaw 61 and 62 open. Because the upper bearing pins 76 and lower bearing pins 77 of the individual clamp jaw 61 and 62 slide along the bearing surfaces 67 and 68 of the cross bar 65 and 66, the clamp jaws 61 and 62 remain in a parallel relationship during opening and closing. However, the jaw motion which would tend to bind the threaded shaft tends to rotate the jaws. Upon clamping of the tube 55 into the V-groove 63 and 64 of the clamp jaw 61 and 62, this rotational movement against the slide surfaces 67 and 68 gives the clamping assemblies 59 and 60 self-locking characteristics.

During manufacture of the rebuilding machine 15 a shaft collar 90 (See FIG. 5) surrounds the shaft 82 and is positioned within the slot 80 defined by the brace member 69. Thrust bearings 91 and 92 are located on each side of the shaft collar 90. The ends of the shaft collar 90 bear upon the thrust-bearings 91 and 92. During machine fabrication, the shaft collar 90 is free to slide on the shaft 82. The clamp jaws 61 and 62 are then clamped upon a master tube shaft (not shown), the centerline axis of which is coincidental with the centerline axis of the machine 15 and with the centerline axes of the end piece fixture assembly 33. When in this carefully aligned position, the shaft collar 90 and the shaft 82 are drilled forming a bore 93. A pin 94 is positioned within the bore 93 thereby connecting the collar 90 to the shaft 82. This permanently fixes the threaded shaft 82 to the slideable clamp jaws 61 and 62 to ensure precise centering throughout the machine 15. A second pin 95 is utilized to pin the hand wheel assembly 87 to the end of the shaft 82.

While in the FIG. 1 embodiment, the tool 37A is shown on the left hand end of the machine, in most situations, a spline end piece 97 is pressed onto the driveshaft tube 55. In this situation, a spline end piece fixture assembly 98 is utilized. The fixture assembly tool 98 includes a collar 99 which is releasably connected to the anvil member 51 by cap screws 96.

Referring to FIGS. 10, 11 and 12, the collar 99 defines a central opening 100 and a longitudinal keyway 101 in its outer periphery. A holder 102 which mounts a pointer 103 is slideably positioned within the keyway 101. The pointer 103 defines a vertical slot 104. A thumbscrew 105 extends through the slot 104 and mounts the pointer 103 to the holder 102. Similarly, the holder 102 defines a horizontal slot 106 and a thumbscrew 107 extends through the slot 106 and mounts the holder 102 in the keyway 101 defined by the collar 99.

Referring to FIG. 12, a center 109 extends through an opening 110 defined in an interior wall of the collar 99. A spring 111 is positioned between the center 109 and the anvil member 51 and urges a conical end 112 of the center 109 towards a conical recess or depression 113 found in the spline end piece 97. The pointer 103 is directly aligned with the machine centerline 50 and also ensures proper phasing between the spline end piece 97 and the U-joint end piece 40. The adjustable pointer 103 because it is pre-aligned with the U-joint tool 37 located at the other end of the machine 15 ensures proper and accurate mechanical phasing.

In a normal machine operation in which the U-joint end piece tool 37 is located at the right hand end and the spline end piece tool 98 is located at the left hand end of the driveshaft rebuilding machine 15, a driveshaft tube 55 is placed in the spaced clamping assemblies 59 and 60. Initially, the anvil member 51 is moved along the guide rods 22 and 23 until a the length is reached that will accomodate the driveshaft tube 55. At this time the stop pins 26 are positioned within the holes 25 defined by the guide rods 22 and 23. An U-joint end piece 40 is positioned within the tool 37 and a spline end piece 97 is positioned against the spline tool 98. The adjustable pointer 103 ensures that proper phasing, as noted above, and the spring biased center 109 ensures that the spline end piece 97 is on the centerline 50 of the machine 15. The hand wheels 87 of the clamping assemblies 59 and 60 are rotated moving the clamp jaws 61 and 62 into position into clamping relationship to the tube 55 ensuring that the tube 55 has its longitudinal centerline along the centerline 50 of the machine 15. Upon correct positioning, the ram 30 of the hydraulic cylinder 28 is extended moving the fixture assembly 33 to the left, as viewed in FIG. 3. During this movement to the left, the clamping assemblies 59 and 60 and the tube 55 also slides to the left as a unit along the guide rods 22 and 23. During this time the clamping assemblies 59 and 60 remain in their clamping position with the clamp jaws 61 and 62 engaging and centering the driveshaft tube 55. Movement to the left continues until resisted by the anvil member 55. As the ram 30 continues to extend, the end pieces 40 and 97 are press-fit into the ends of the driveshaft tube 55. At this time, the ram 30 is retracted, the clamping assemblies 59 and 60 opened and the completed driveshaft removed. The driveshaft rebuilding machine 15 is then ready for another rebuilding operation.

FIGS. 13-16 show a plurality of fixture assemblies or tools which can be readily mounted and dismounted on an anvil member 51a. In these embodiments, the anvil member 51a defines a bore 115 which extends completely through the anvil member 51a. In each embodiment a mounting screw 116 extend through the bore 115 to connect a tool to the anvil member 51a.

Figure 13:
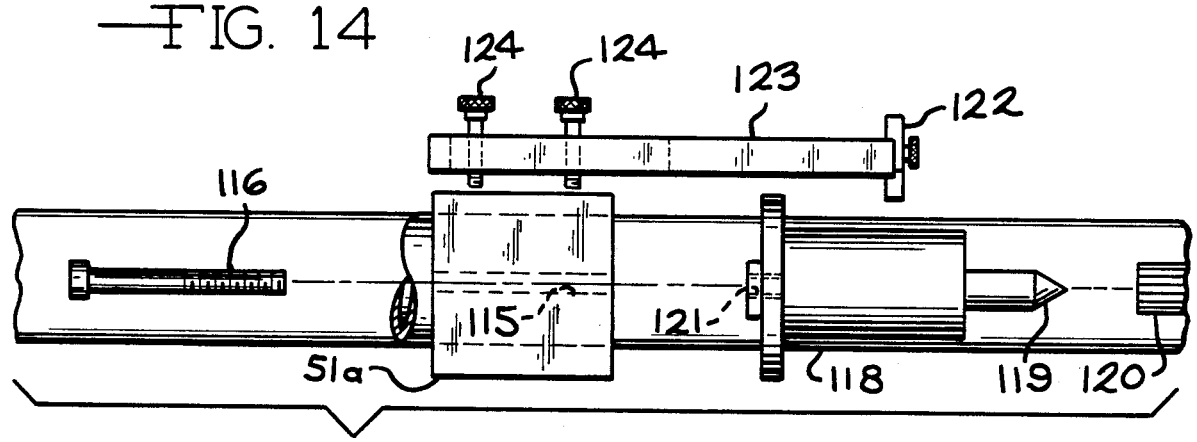
FIG. 13 is an exploded view of a spline tooling fixture.

FIG. 13 discloses a spline tool 118 which is utilized in a manner similar to the spline end piece fixture assembly or tool 98, shown in FIGS. 10, 11 and 12.

The spline tool 118 includes a spring loaded center 119 which engages a central depression in a spline 120. The tool 118 includes a threaded opening 121 which receives the mounting screw 115 for connection of the tool 118 to the anvil member 51a. In this embodiment a vertically adjustable pointer 122 is mounted on a holder 123. Similarly, the holder 123 is adjustably mounted by thumbscrews 124 to the anvil member 51a. The thumbscrews 124 allow transverse adjustment of the holder 123. Both adjustments are to ensure proper centering and proper phasing as discussed above.

Figure 14:
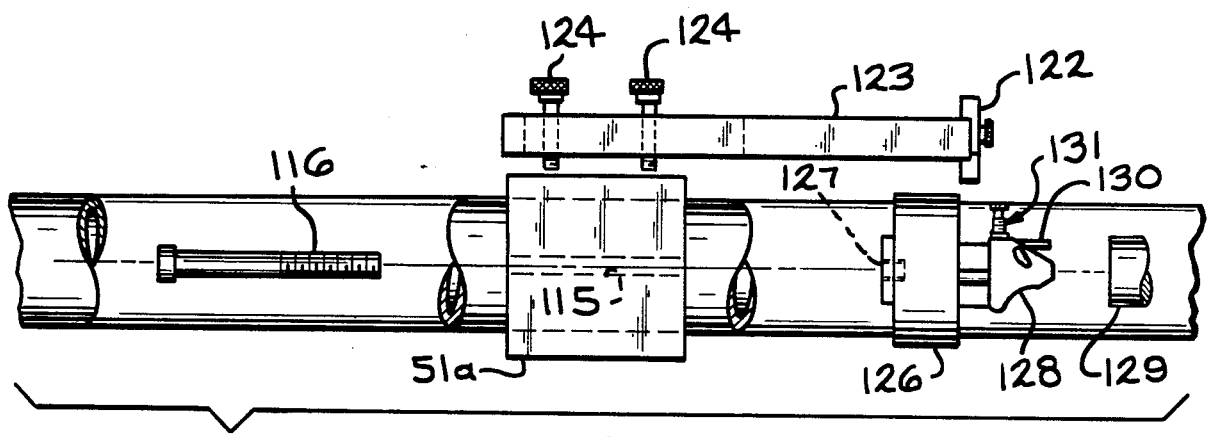
FIG. 14 is an exploded view of an internal spline tooling fixture.

An internal spline tool 126 is shown in FIG. 14. The internal spline tool 126 has a threaded opening 127 and is attached to the anvil member 51a in the same manner as the spline tool 118 was attached.

The internal spline tool 126 includes a cone head 128 which is spring biased toward a tube 129 having an internal spline. A spline rod 130 extends toward the tube 129 and is vertically adjustable by use of an interconnected adjustment assembly 131. The adjustable spline rod 130 is utilized to ensure the proper centering and proper phasing of the internally splined tube 129.

Figure 15:
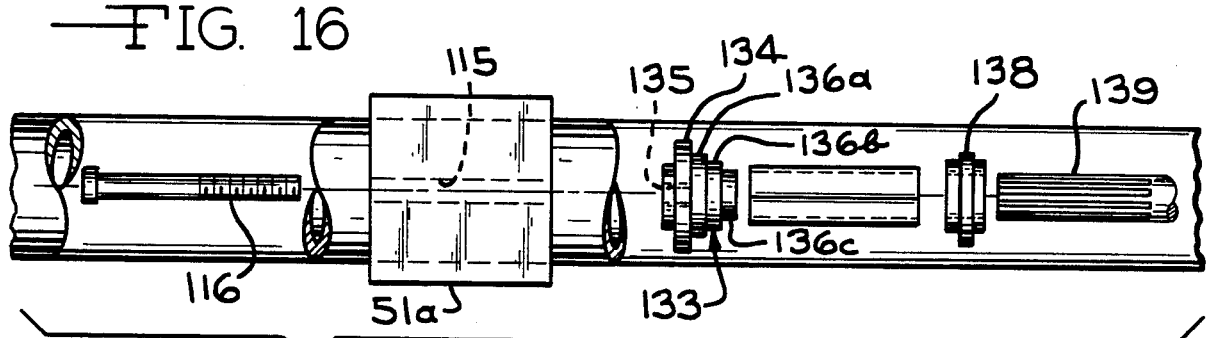
FIG. 15 is an exploded view of a bearing press tooling fixture.

A bearing press tool 133 is shown in FIG. 15. The bearing press tool 133 includes a conical member 134 which defines a threaded opening 135 on its rear side. The conical member 134 of the bearing press tool 133 is attached to the anvil member 51a by the mounting screw 116 extending through the threaded opening 135. The conical member 134 includes a plurality stepped circular flanges 136a,b, and c. The step flanges are progressively smaller diameters and receive pressing tubes 137 of mating diameters. The pressing tube 137 shown in FIG. 15 receives the step flange 136c.

The bearing press tool 133 is utilized to press a bearing 138 onto a spline 139.

Figure 16:
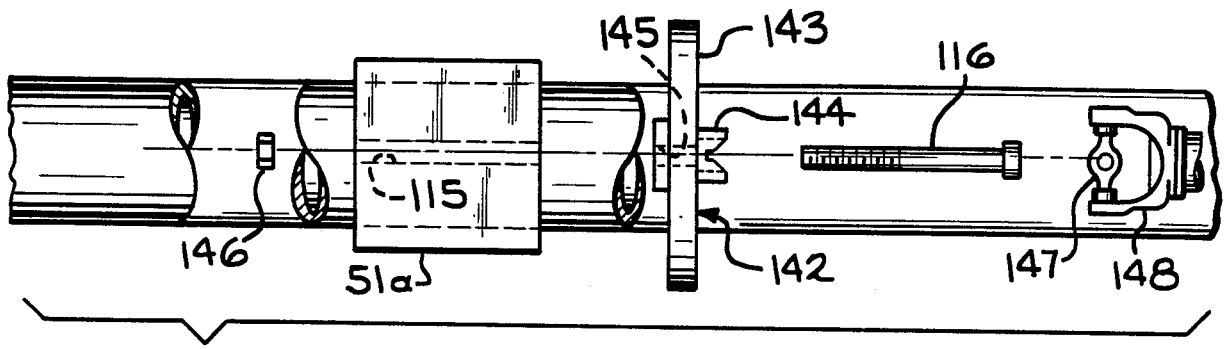
FIG. 16 is an exploded view of a V-block tooling fixture.

A V-block tool 142 is shown in FIG. 16. The tool 142 includes a cross member 143 which mounts a V-block 144. The tool 142 defines a central bore 145 which receives the mounting screw 116. In this embodiment, the mounting screw 116 extends through the V-block tool, through the bore 115 and is secured to the anvil member 51a by a nut 146. In operation, the V-block 144 receives and alignes a journal cross 147 of a U-joint 148 to correctly center and phase such end piece.

It is understood that many changes and modifications may be made to the structure disclosed in the drawings and still fall within the scope of the following claims.

What we claim is:

1. A driveshaft machine for installing a driveshaft end piece on a driveshaft tube comprising, in combination, opposed machine ends, support members extending between said opposed machine ends, a pair of parallel guide rods mounted between said ends, a pair of clamp assemblies spaced from one another and mounted for movement on said parallel guide rods, said clamp assemblies including clamp jaws for engaging and centering a driveshaft tube, each of said clamp assemblies including a cross bar operatively mounted for movement along said guide rods, said cross bar defining upper and lower slide surfaces, each of said clamp jaws including an upper bearing pin for movement along such upper slide surfaces and a lower bearing pin for movement along said lower slide surfaces, means for moving said clamping jaws towards and away from one another, fixture means adjacent at least one machine end for aligning a driveshaft end piece with the driveshaft tube, and cylinder means for moving said fixture means relative to the driveshaft tube to press fit the driveshaft end piece with the driveshaft tube.

2. A driveshaft machine, according to claim 1, wherein said clamp jaws define opposed V-grooves for engaging and centering the driveshaft tube.

3. A driveshaft rebuilding machine according to claim 1, including an adjustable cross member mounted for movement on said parallel guide rods, a fixture tool removably mounted on said adjustable cross member and stop means for stopping movement of said adjustable cross member relative to said guide rods.

4. A driveshaft rebuilding machine, according to claim 3, wherein said stop means include a plurality of spaced rods and stop pins for positioning in selected ones of said holes.

5. A driveshaft rebuilding machine, according to claim 3, including handle means on said adjustable member.

6. A driveshaft rebuilding machine, according to claim 1, wherein said cylinder means comprises a hydraulic cylinder having an extendable ram, said tooling means being operatively connected to the end of said ram.

7. A driveshaft machine, according to claim 6, wherein said cylinder means is a double acting hydraulic cylinder.

8. A driveshaft machine, according to claim 1, wherein said lower bearing pins of each of said clamp jaws define a threaded opening, said moving means comprising a threaded shaft operatively engaged in said threaded openings defined by said pins.

9. A driveshaft machine, according to claim 8, including a hand wheel mounted on one end of said shaft.

10. A driveshaft machine for installing a driveshaft end piece on a driveshaft tube, the machine defining a longitudinal centerline, comprising in combination, opposed machine ends, support members extending between said opposed machine ends, a pair of parallel guide rods mounted parallel to such centerline, a tooling fixture for mounting the end piece positioned adjacent one of said machine ends, an adjustable cross member mounted for movement along said guide rods adjacent the other of said machine ends, a pair of clamping assemblies mounted for movement along said guide rods, each of said clamping assemblies including a pair of opposed clamp jaws for engaging and centering the driveshaft tube, a cross bar operatively mounted for movement along said guide rods and defining upper and lower surfaces, each of said clamp jaws including an upper bearing member for movement along such upper surface and a lower bearing member for movement along said lower bearing surface, said lower bearing members of said clamp jaws defining a threaded opening perpendicular to the longitudinal centerline, a rotatable threaded shaft operatively engaged in said threaded openings, and cylinder means for moving said tooling fixture relative to the driveshaft tube for press-fitting the driveshaft end piece to the driveshaft tube.

11. A driveshaft machine, according to claim 10, including an opposed tooling fixture for mounting a driveshaft end piece removeably mounted on said adjustable cross member.

12. A driveshaft machine, according to claim 10, wherein said opposed tooling fixture includes a spring biased center for engagement with the end piece and an adjustable pointer for aligning the end piece to obtain proper phasing.

13. A driveshaft machine, according to claim 10, wherein the end piece is a U-joint having a yoke and a journal cross and wherein said tooling fixture includes a channel, a pair of opposed V-grooves adjacent the channel and a pair of opposed side plates whereby said channel closely receives the yoke, said V-grooves receive the journal cross and said side plates closely receive the outer ends of said cross arms.

14. A driveshaft machine, according to claim 10, wherein said opposed machine ends are constructed of concrete.

15. A driveshaft machine, according to claim 14, including end blocks mounted on the upper surfaces of said machine ends, said end blocks defining openings for receiving and mounting said parallel guide rods, one of said end blocks defining a cylinder opening for mounting said cylinder means, said cylinder means comprising a hydraulic cylinder having a ram operatively connected to said tooling fixture.

16. A driveshaft machine, according to claim 10, wherein said opposed clamp jaws define opposed V-grooves for engaging and centering the driveshaft tube.

* * * * *